Dec. 9, 1930.           F. I. RAYMOND           1,784,538
            CONTROL APPARATUS FOR HEATING SYSTEMS
                    Filed June 13, 1929
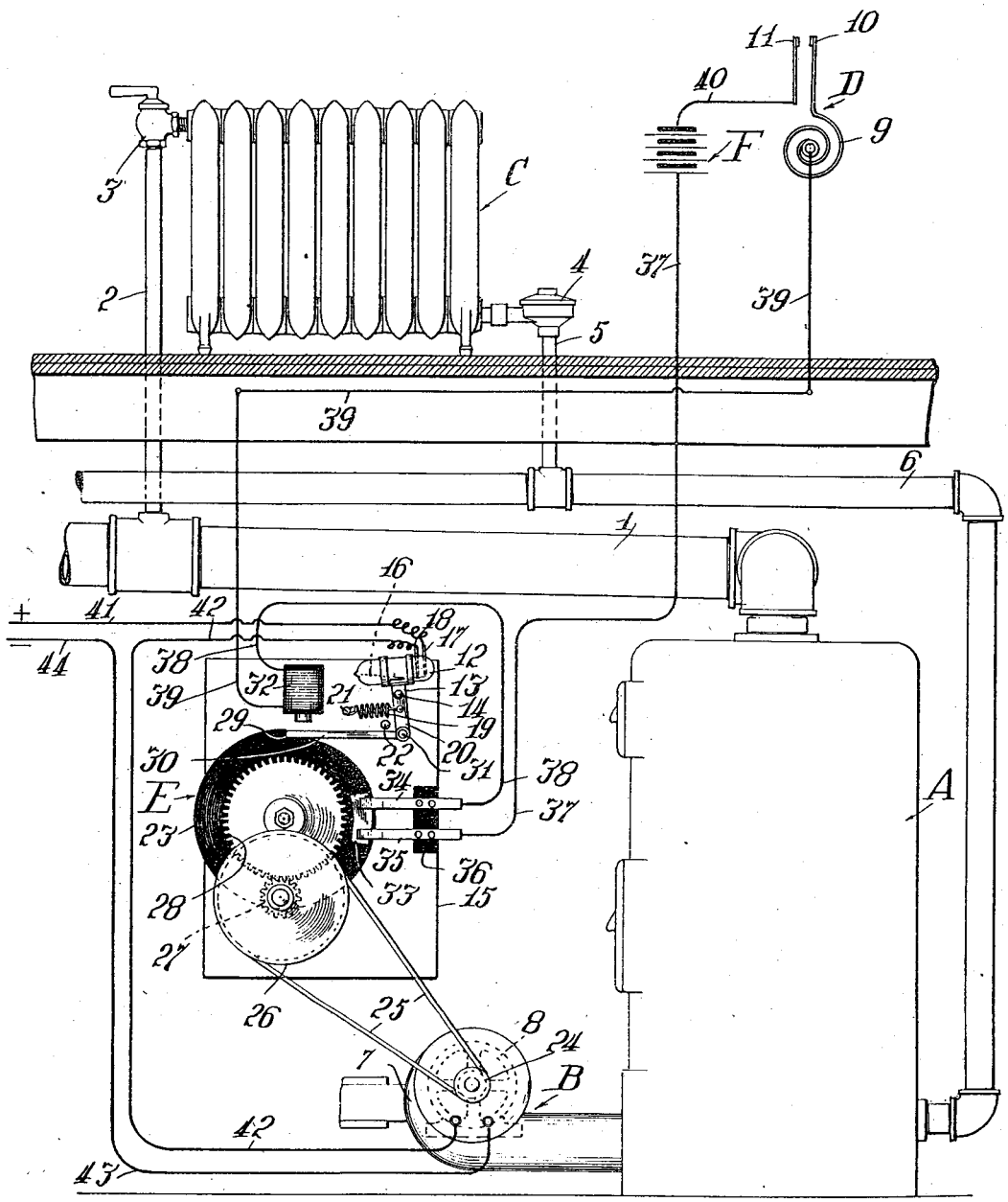
Inventor
Fred I. Raymond
By Barnett & Truman
Attorneys Patented Dec. 9, 1930

1,784,538

UNITED STATES PATENT OFFICE

FRED I. RAYMOND, OF RIVER FOREST, ILLINOIS

CONTROL APPARATUS FOR HEATING SYSTEMS

Application filed June 13, 1929. Serial No. 370,610.

This invention relates to a new and improved control mechanism for heating systems, and more particularly to an improved mechanism for operating the system on so-called "point control", that is the actuation of the control apparatus is dependent upon the making or breaking of a circuit at the room thermostat or equivalent device, when a certain predetermined maximum or minimum temperature is attained, and does not require two fixed contacts against which the movable contact of the thermostat is brought alternatively in response to the rise and fall of the temperature between certain limits. This point control has the advantage of minimizing the lag between the room temperature change and the response of the system which occurs when the movable thermostatic contact must move from one fixed contact to another to bring about the reverse movements of the control mechanism, which ordinarily results in alternate overheating and underheating of the room.

This control mechanism is applicable to heating systems of all types, and to any other system of temperature control. In the following detailed specifications, there is disclosed by way of example, the application of this control mechanism to an oil-burning furnace for a steam heating system, in which case the control mechanism governs the supply of fuel to the combustion chamber. If used with a furnace burning lump coal or other solid fuel, the control mechanism would be employed for opening and closing dampers for regulating the drafts, and if the control mechanism were used with a unit of a central station heating plant the control mechanism would govern the supply of the heating medium to the radiating system.

The general object of the invention is to provide an improved point control mechanism for heating systems, such as briefly referred to hereinabove and disclosed more in detail in the specifications which follow.

Another object is to provide a point control system which will operate without too rapid fluctuation so as to avoid a flickering flame, or other unsteady or uncertain operation of the heat generating or supply system.

The accompanying drawing shows the heating system and control mechanism diagrammatically in elevation.

In the heating system here shown by way of example, the steam generator is shown at A, at B is indicated generally a device for feeding fuel and air to the combustion chamber of the generator, and C indicates the radiator for heating the room in which is positioned the thermostat D. At E is indicated generally the interrupting mechanism of the controlling apparatus forming the particular subject matter of this invention.

The generator A supplies steam through the supply main 1, riser 2, and inlet valve 3 to the radiator C, and condensate passes out through steam trap 4, riser 5, and return main 6 back to the generator. It will be understood, of course, that this steam heating system is shown merely by way of example and might contain and utilize many auxiliary features not herein disclosed.

In the present example, the feeding mechanism B comprises a blower or equivalent device 7 driven by a motor 8 for feeding fuel and air to the combustion chamber of the generator A. When more heat is needed the motor 8 will be operated to feed additional fuel to the generator, when less heat is needed, the motor 8 will be stopped so as to temporarily discontinue the feeding of fuel into the combustion chamber. The thermostat indicated diagrammatically at D may take a number of forms, but in the example here shown comprises a bimetallic coil 9, and adapted whenever the room temperature rises above a predetermined minimum temperature to move the movable contact 10 out of engagement with the fixed contact 11. Whenever the temperature falls to this predetermined minimum, the movable contact 10 will be swung back into engagement with the fixed contact 11. By providing any suitable means for adjusting the position of the fixed contact 11, the thermostat may be set to function at any desired minimum temperature.

The mechanism indicated generally at E comprises control switches and a timing device whereby the momentary engagement of contacts 10 and 11 of the thermostat will inaugurate a predetermined period of operation of the motor 8, at the expiration of which period of operation the motor 8 will cease to operate in case the room temperature has been raised so as to move the contacts 10 and 11 out of engagement. In case the necessary increase in room temperature has not been obtained and the movable contact 10 is still in engagement with the contact 11, the motor 8 will not stop but another period of operation thereof will be inaugurated and this cycle of events will be repeated until the room temperature has been raised above the desired minimum.

This controlling and timing mechanism in the example here shown comprises a main control switch 12 in the form of a mercury tube switch carried by a bracket 13 which is fulcrumed at 14 on a stationary support 15 so that it may be tilted to one side or other of the vertical plane through fulcrum 14 so as to cause a globule of mercury 16 to run to one end or the other of tube 12. In one end of the tube is positioned a pair of spaced contacts 17 and 18 so that when the globule 16 is at this end of the tube a circuit is completed. When the globule 16 is at the other end of the tube (as shown in the drawings) the circuit is broken. A contraction spring 19 secured at one end to the lower arm 20 of bracket 13 and fixed at the other end 21 to the supporting frame 15 is adapted to normally swing arm 20 over against stop 22 thus tilting the mercury switch so as to close the circuit at 16, 17 and 18.

The timing mechanism comprises a rotary disk 23 adapted to be rotated slowly in a clockwise direction by means of suitable reduction gearing consisting in the example here shown of a small pulley 24 on the shaft of motor 8 connected by belt 25 with a large pulley 26, which in turn drives a small pinion 27 meshing with a large gear 28 secured to the rotary disk 23. The periphery of disk 23 is slightly spiral or non-circular so as to provide a stop shoulder 29 at one point in the circumference of the disk. A link 30 is pivoted at one end 31 to the lower end of arm 20 of bracket 13, and the other end of the link 30 normally rests on the periphery of disk 23.

The metallic link 30 is adapted to serve as the armature of an electromagnet 32, so that when this magnet is energized the link 30 will be drawn upwardly out of engagement with stop shoulder 29 on disk 23. A contact plate 33 is so positioned on disk 23 that when the device is in the stop position shown in the drawings a pair of relatively fixed spring contacts 34 and 35 carried by a block of insulation 36 on supporting member 15 will be bridged by this movable contact plate 33 so as to complete a circuit therethrough. The remaining portion of the face of disk 23 with which spring contacts 34 and 35 engage is made of insulating material so that the circuit through these spring contacts will be broken when the disk 23 has been rotated from the position shown in the drawings.

The thermostat circuit runs from battery F through wire 37, contact 35, movable contact 33, fixed contact 34, wire 38, magnet 32, wire 39, movable contact 10 of the thermostat D, fixed contact 11, and wire 40 back to the battery. The motor energizing circuit runs from positive main 41 to switch contact 17, mercury globule 16, switch contact 18, wire 42 to the motor 8, thence returning through wire 43 to the negative main 44.

With the mechanism in the positions shown in the drawing, the room temperature is above the desired minimum and all parts are at rest, the thermostat circuit being broken since the movable contact 10 has been moved out of engagement with fixed contact 11. The motor circuit has been broken and motor 8 has ceased to rotate to feed fuel to the generator, since the stop member 29 on disk 23 has been moved into engagement with link 30 thus tilting the mercury switch against the resistance of spring 19 so as to cause the globule 16 to run to the left-hand end of the tube and thus break the motor circuit. This condition will persist until the room temperature has fallen to the predetermined minimum, whereupon movable contact 10 will swing into engagement with fixed contact 11 due to the contraction of the temperature responsive tube 9. The thermostat circuit will now be completed so as to energize magnet 32 and lift the link 30 out of engagement with stop 29, whereupon spring 19 will contract so as to tilt the mercury switch 12 and complete the motor circuit when mercury globule 16 runs into engagement with the contacts 17 and 18. The motor 8 now being energized will rotate and cause the mechanism 7 to feed fuel into the combustion chamber of the generator, thus raising the temperature of the heating medium.

The motor 8 will continue to function until the disk 23 of the timing mechanism which is driven by the motor has been rotated through one complete revolution. At the start of this period of rotation of disk 23, the contact plate 33 will be moved out of engagement with spring contact 34 so as to break the thermostat circuit at this point, thus deenergizing magnet 32 even though the thermostat contacts 10 and 11 may still be in engagement. The link 33 will now fall back upon the periphery of disk 23, but the stop 29 has now been rotated under the link 30 so it will not again engage therewith until the disk 23 has completed one revolution. At the end of this revolution of disk 23 the plate 33 will again bridge the contacts 34 and 35 so as to complete the thermostat circuit at this point, but if in the meantime the room temperature has been raised so as to cause the thermostat contact 10 to move out of engagement with fixed contact 11, the magnet 32 will not be energized and the stop member 29 on the rotating disk 23 will engage the end of link 30 and tilt the mercury switch against the resistance of spring 19 so as to break the motor circuit, whereupon the motor 8 will cease to rotate and the parts will be returned to the positions shown in the drawings.

If, on the other hand, the room temperature has not been raised sufficiently at the end of one period of revolution of disk 23 to cause the thermostat to move contact 10 out of engagement with contact 11, the thermostat circuit will be again completed when contact plate 33 moves under the spring contacts 34 and 35 and the magnet 32 will be energized to lift the link 30 so that it will not be engaged by stop 29 and the switch 12 will not be tilted to break the motor circuit. As a consequence another period of operation of the timing mechanism will be inaugurated and the motor 8 will continue to function until the disk 23 has made a second complete revolution. This process may be continued indefinitely until the room temperature has been sufficiently elevated to cause the temperature responsive member of the thermostat to move the contact 10 out of engagement with the contact 11. When this occurs, the operation of the fuel feeding mechanism will be stopped at the end of the current period of rotation of disk 23.

It will thus be seen that even though the thermostat contacts 10 and 11 are only brought momentarily into engagement, there can be no flickering of the flame or chattering of the actuating mechanism, since when control switch 12 is once closed and the operation of the timing mechanism E has been started, the fuel feeding mechanism will continue to be operated for a predetermined period of time, depending upon the rate at which disk 23 is rotated. The fuel-feeding mechanism will thus be operated at necessary intervals, and for predetermined minimum periods of time at each operation, and it will also be apparent that this period of operation of the feeding mechanism can be lengthened in case the desired rise in room temperature has not taken place without interrupting the continued energization and rotation of the feed actuating motor 8.

I claim:

1. In combination with a heating system, electrically actuated mechanism for accelerating the heat output of the system, a thermostat comprising a fixed and a movable contact which are brought into engagement at a determined minimum temperature, a control switch for the energizing circuit of the heat accelerating mechanism, means tending normally to close the control switch, a locking mechanism for holding the control switch open, means actuated when the thermostat contacts are in engagement for releasing the locking mechanism, and a timing mechanism for actuating the locking mechanism to open the control switch at the end of a predetermined period of operation of the heat accelerating mechanism.

2. In combination with a heating system, mechanism for accelerating the heat output of the system including a driving motor, an actuating circuit for the motor, a control switch in this circuit, a timing mechanism driven by the motor including a rotatable member adapted to travel a predetermined distance during a predetermined period of operation of the accelerating mechanism, means for closing the control switch, means actuated at the end of the period of rotation of the rotatable member for opening the control switch in opposition to the closing means, a magnet for releasing the last mentioned means to permit the switch to be closed, a thermostat comprising a fixed and a movable contact which are brought into engagement at a predetermined minimum temperature, an energizing circuit including the thermostat contacts and the magnet, and a circuit breaker for opening the thermostat circuit during the period of rotation of the rotatable member.

3. In combination with a heating system, mechanism for accelerating the heat output of the system including a driving motor, an actuating circuit for the motor, a control switch in this circuit, a timing mechanism driven by the motor including a rotatable member adapted to travel a predetermined distance during a predetermined period of operation of the accelerating mechanism, means for closing the control switch, means actuated at the end of the period of rotation of the rotatable member for opening the control switch in opposition to the closing means, a magnet for releasing the last mentioned means to permit the switch to be closed, a thermostat comprising a fixed and a movable contact which are brought into engagement at a predetermined minimum temperature, an energizing circuit including the thermostat contacts and the magnet, and a circuit-breaker including a pair of spaced fixed contacts and a movable contact carried by the rotatable member whereby the thermostat circuit will be broken during the period of rotation of the member but closed at the beginning and end thereof.

4. In combination with a heating system, mechanism for accelerating the heat output of the system including a driving motor, an actuating circuit for the motor, a control switch in this circuit, a timing mechanism driven by the motor including a rotatable disc, adapted to make one rotation during a predetermined period of operation of the accelerating mechanism, means for normally closing the control switch, means actuated by the disc at the end of its timed rotation for moving the control switch to open position, a magnet for releasing the last named means to permit the control switch to be closed, a thermostat comprising a fixed and a movable contact which are brought into engagement at a predetermined minimum temperature, an energizing circuit including the thermostat contacts and the magnet, and a circuit breaker in the last mentioned circuit including a pair of fixed contacts and a contact positioned on the disc whereby the thermostat circuit will be closed at this point at the beginning and end of the rotation of the disc but open at other times.

5. In combination with a heating system, mechanism for accelerating the heat output of the system including a driving motor, an actuating circuit for the motor, a control switch in this circuit, a timing mechanism driven by the motor including a rotatable disc adapted to make one rotation during a predetermined period of operation of the accelerating mechanism means for normally closing the control switch, means actuated by the disc at the end of its timed rotation for moving the control switch to open position, a magnet for releasing the last named means to permit the control switch to be closed, a thermostat comprising a fixed and a movable contact which are brought into engagement at a predetermined minimum temperature, an energizing circuit including the thermostat contacts and the magnet, and a circuit breaker for opening the thermostat circuit during the period of rotation of the disc.

6. In combination with a heating system, mechanism for accelerating the heat output of the system including a driving motor, an actuating circuit for the motor, a tilting control switch in this circuit, a spring for normally tilting the switch to closed position, a timing mechanism driven by the motor including a rotatable disc adapted to make one complete rotation during a predetermined period of operation of the accelerating mechanism, a link attached to the control switch at one end, a stop on the disc adapted to engage the link at the end of the rotation of the disc and move the switch to open position against the action of the spring, a magnet positioned to withdraw the link from engagement with the stop and permit the spring to close the control switch, a thermostat comprising a fixed and a movable contact which are brought into engagement at a predetermined minimum temperature, an energizing circuit including the thermostat contacts and the magnet, and a circuit breaker in the last-mentioned circuit including a pair of relatively fixed contact members and a contact plate positioned on the disc whereby the thermostat circuit will be closed at this point at the beginning and end of the rotation of the disc but open at other times.

7. In a system for controlling temperature, means for changing the temperature, thermostatic means operating at a predetermined temperature for setting the temperature changing means in operation, and means operated by the temperature changing means for halting the operation thereof after a predetermined minimum period of time, said latter means being ineffective if the thermostatic means is still in the operative position.

8. In a system for controlling temperature, means for changing the temperature, thermostatic means operating at a predetermined temperature for setting the temperature changing means in operation, and means for halting the operation of the temperature changing means after a predetermined minimum period of time, said last named means being ineffective if the thermostatic means is still in the operative position.

9. In a system for controlling temperature, means for changing the temperature, thermostatic means operating at a predetermined temperature for setting the temperature changing means in operation, timing means, and means operated by said timing means for halting the operation of the temperature changing means after a predetermined minimum period of time, said last named means being ineffective if the thermostatic means is still in the operative position.

FRED I. RAYMOND.